United States Patent [19]

Read et al.

[11] Patent Number: 4,935,270

[45] Date of Patent: Jun. 19, 1990

[54] HEAT RECOVERABLE ARTICLE WITH HEAT CURABLE ADHESIVE COATING

[75] Inventors: Michael J. Read, Lechlade; Michael R. Read, Fairford; Stephen J. Osborne; Geoffrey P. Hakes, both of Swindon, all of England

[73] Assignee: Raychem Limited, London, England

[21] Appl. No.: 318,086

[22] Filed: Mar. 2, 1989

Related U.S. Application Data

[60] Division of Ser. No. 110,635, Oct. 16, 1987, Pat. No. 4,844,959, which is a continuation of Ser. No. 701,401, Feb. 14, 1985, abandoned.

[30] Foreign Application Priority Data

Feb. 14, 1984 [GB] United Kingdom ................ 8403823

[51] Int. Cl.$^5$ .............................................. B32B 3/20
[52] U.S. Cl. ................................. 428/34.9; 428/343; 428/347; 428/348; 428/355
[58] Field of Search ............... 428/343, 347, 348, 355, 428/34.9; 523/404, 417, 418

[56] References Cited

U.S. PATENT DOCUMENTS

| 2,906,723 | 9/1959 | Reese | 260/42 |
|---|---|---|---|
| 3,703,434 | 11/1972 | Schaff | 161/167 |
| 3,746,068 | 7/1973 | Deckert et al. | 411/258 |
| 3,806,483 | 4/1974 | Juba et al. | 523/412 |
| 4,070,225 | 1/1978 | Batdorf | 156/330 |
| 4,113,684 | 9/1978 | Petrie | 428/417 X |
| 4,190,714 | 2/1980 | Isaksen et al. | 525/163 |

FOREIGN PATENT DOCUMENTS

| 0039230 | 11/1981 | European Pat. Off. . |
|---|---|---|
| 1177484 | 4/1959 | France . |
| 2164887 | 8/1973 | France . |
| 80/00447 | 3/1980 | PCT Int'l Appl. . |
| 1173372 | 2/1959 | United Kingdom . |
| 846380 | 8/1960 | United Kingdom . |
| 872797 | 7/1961 | United Kingdom . |
| 915575 | 1/1963 | United Kingdom . |
| 964576 | 7/1964 | United Kingdom . |
| 988410 | 4/1965 | United Kingdom . |
| 1011515 | 12/1965 | United Kingdom . |
| 1043998 | 9/1966 | United Kingdom . |
| 1067043 | 4/1967 | United Kingdom . |
| 1215683 | 12/1970 | United Kingdom . |
| 1276372 | 6/1972 | United Kingdom . |
| 1318926 | 5/1973 | United Kingdom . |
| 1371967 | 10/1974 | United Kingdom . |
| 1379938 | 1/1975 | United Kingdom . |
| 1405096 | 9/1975 | United Kingdom . |
| 1438726 | 6/1976 | United Kingdom . |
| 1458121 | 12/1976 | United Kingdom . |
| 1472198 | 5/1977 | United Kingdom . |
| 1472199 | 5/1977 | United Kingdom . |
| 1523617 | 9/1978 | United Kingdom . |
| 1548780 | 7/1979 | United Kingdom . |
| 1556988 | 12/1979 | United Kingdom . |
| 1559284 | 1/1980 | United Kingdom . |
| 1570049 | 6/1980 | United Kingdom . |

OTHER PUBLICATIONS

Lee and Neville, Handbook of Epoxy Resins (McGraw-Hill), pp. 20-14 and 20-21.
WO 82/00651 (1982) Housenick.

*Primary Examiner*—Veronica P. Hoke
*Assistant Examiner*—Anang Sridharan
*Attorney, Agent, or Firm*—Yuan Chao; Edith Rice; Herbert Burkard

[57] ABSTRACT

A dimensionally heat-recoverable article has on one of its surfaces a heat-curable adhesive coating. The coating has a mixture of substantially solid particles of a first reactive component with separate substantially solid particles of at least a second reactive component, the first and second components being capable of reacting together to effect curing of the coating when the heat-recoverable article is heated to its recovery temperature. The particles have a size distribution in which not more than 40% by weight of the particles are less than 50 micrometers in size and at least 90% by weight of the particles are less than 300 micrometers in size.

20 Claims, No Drawings

HEAT RECOVERABLE ARTICLE WITH HEAT CURABLE ADHESIVE COATING

This application is a divisional of Application No. 07/110,635, filed Oct. 16, 1987 now U.S. Pat. No. 4,844,959 which is a continuation of Application No 06/701,401, filed Feb. 14, 1985, now abandoned, the disclosures of which are herein incorporated by reference.

This invention relates to adhesive compositions and especially to adhesive compositions that may be used with dimensionally heat-recoverable articles A heat-recoverable article is an article the dimensional configuration of which may be made substantially to change when subjected to heat treatment Usually these articles recover on heating towards an original shape from which they have previously been deformed but the term "heat-recoverable" as used herein also includes an article which on heating adopts a new configuration even if it has not been previously deformed.

In their most common form, such articles comprise a heat-shrinkable sleeve made from a polymeric material exhibiting the property of elastic or plastic memory as described, for example in U.S. Pat. Nos. 2,027,962 3,086,242 and 3,597,372. As is made clear in for example U.S. Pat. No. 2,027,962, the original dimensionally heat-stable form may be a transient form in a continuous process in which for example an extruded tube is expanded whilst hot to a dimensionally heat-unstable form but in other applications a preformed dimensionally heat-stable article is deformed to a dimensionally heat-unstable form in a separate stage.

In the production of heat-recoverable articles the polymeric material may be cross-linked at any stage in the production of the article that will enhance the desired dimensional recoverability. One manner of producing a heat-recoverable article comprises shaping the polymeric material into the desired heat-stable form. subsequently cross-linking the polymeric material, heating the article to a temperature above the crystalline melting point or, for amorphous materials the softening point. as the case may be of the polymer. deforming the article and cooling the article whilst in the deformed state so that the deformed state of the article is retained. In use, since the deformed state of the article is heat-unstable application of heat will cause the article to assume its original heat-stable shape.

In other articles as described. for example in British Patent 1,440,524 an elastomeric member such as an outer tubular member is held in a stretched state by a second member. such as an inner tubular member which, upon heating weakens and thus allows the elastomeric member to recover.

Heat-recoverable articles are often used in applications in which they are required to be coated with an adhesive. In certain applications such articles are required to be used with curable adhesives in order that the bonds so formed will exhibit good performance at high temperatures and/or under high loads. One example of such an application is where hollow heat-recoverable moulded articles having one or more outlets (often called end-caps, boots, transitions or udders) are used to enclose various parts of cable harnesses. Until recently it had not been possible to pre-coat such articles with a heat-curable adhesive that would cure when the article was recovered because the relatively low recovery temperatures of the articles e g. about 100° to 130° C. and the relatively short recovery times e.g. up to 2 minutes. were incompatible with an adhesive that would have an acceptably long storage life, and so it was necessary to coat the articles with a two-component curable adhesive immediately prior to installation.

Recently, it has been proposed in U.K Patent Specification No. 2,104,800A. the disclosure of which is incorporated herein by reference that heat-recoverable articles may be coated with a heat-curable adhesive in which the reactive components are in the form of separate particles that are mixed together. It has been observed that such adhesives exhibit a synergistic increase in rate of cure when used with a heat-recoverable article which enables them to cure sufficiently rapidly when the article is recovered and yet have an acceptably long storage life.

Although the coated articles so formed work well in practice it has been found that the functional performance of the adhesives may be considerably improved.

According to one aspect the present invention provides a heat-curable adhesive composition which comprises a plurality of reactive components that will react together to cure the adhesive composition. The components existing separately from one another in the form of solid particles that are mixed together and which will fuse when heated. The particles having a size distribution in which not more than 40% preferably not more than 35% and especially not more than 30% by weight of the particles are less than 50 micrometers in size and substantially all the particles that is to say at least 90% and especially at least 95% by weight are less than 300 micrometers in size.

Preferably not more than 60% more preferably not more than 50% and especially not more than 40% by weight of the particles are less than 75 micrometers in size and preferably not more than 70%. especially not more than 60% by weight of the particles are less than 100 micrometers in size. The preferred particle size distributions are those in which the particles have a r weight average particle size in the range of from 75 to 125 micrometers It has been observed that the correct choice of particle size distribution is important in determining whether or not the adhesive will exhibit the required high temperature performance properties. For example the German Military V.G. Specification No. 95343 part 14 for testing harness systems. issued by the Bundesamt fur Wehrtechnik und Beschaffung includes a static load test in which the bonds between the harness components are subjected to a 5 kg force load at 100° C. for 4 hours without failing or without shearing by more than 5 mm. It had been considered that particulate curable adhesives having the finest particle size distributions commensurate with adequate storage stability would exhibit the best performance on the basis that the finer the particles the greater their surface area/volume ratio and the more intimate their mixing would be, and indeed this belief was borne out when the adhesives were tested using conventional lap-shear test methods. However, surprisingly it has been observed that although lap-shear values improve as the adhesive particle size is reduced, such adhesives fail the V.G. static load test completely and that only those adhesives having relatively coarse particles according to this aspect of the invention pass the test. The reason why this is so is not known. Heat-curable adhesives which may be suitable for the present invention include, those described in British Patent Application 2104800.

Preferred reactive components are those which are capable of reacting together at ambient temperatures, e.g. when forced into intimate contact by sheat forces or when dissolved in a mutual solvent.

Preferably one of the reactive components is a thermoplastic epoxy resin, for example an epoxy resin based on a bisphenol A or an epoxy novolak resin, in which case the other reactive component may comprise a carboxylic acid, phenolic resin, anhydride or isocyanate or a material having reactive amine groups. Preferably the adhesive is based on a thermoplastic epoxy resin as one reactive component and a material containing reactive amine groups as the or at least one other reactive component. The material containing free amine groups may be a polyamide, for example one that is used conventionally as a hot-melt adhesive. These polyamides are characterized by the fact that their amide linkages are separated by an average of at least fifteen carbon atoms and have amorphous structures in contrast with the more highly crystalline, fibre forming polyamides such as nylon 6 or nylon 6.6. The polyamides preferably have an amine number of at least 5, the upper limit for the amine number being determined by the fact that as the amine number increases the polyamides become liquid at lower temperatures.

Alternatively or in addition the or at least one material having reactive amine groups is one based on a polymer that is the same as or similar to that on which the epoxy resin is based. For example, and preferably the or at least one material containing reactive amine groups is an adduct of the epoxy resin that is used with a compound containing reactive amine groups. preferably with an aliphatic diamine or triamine and especially with ethylene diamine or ethylene triamine.

It has been found that the use of an epoxy-amine compound adduct as the other reactive component or one of the other reactive components can significantly improve the cure rate of the adhesive in relation to its storage life, thereby permitting the storage life of the adhesive or the cured properties thereof to be improved or allowing greater freedom to alter the adhesive in order to optimise its other properties. Thus according to another aspect. The invention provides a heat-curable adhesive composition, which comprises a plurality of reactive components that will react together to cure the adhesive composition, the reactive components existing separately from one another in the form of particles which are mixed together and which will fuse when heated, at least one of the reactive components being a thermoplastic epoxy resin and the or at least one other reactive component being an adduct of the epoxy resin with a compound containing reactive amine groups.

The adduct may, if desired, be used as the sole reactive component that contains reactive amine groups although it is preferred for the adduct to be present in combination with at least one other reactive amine group such as a thermoplastic polyamide for example to improve flexibility of the adhesive. Preferably the adhesive contains from 30 to 90% and especially from 40 to 80% by weight adduct based on the total weight of the adduct and other reactive amine group containing components.

Chemical curing accelerators may also be present in the adhesive either blended with one of the reactive components or as separate particles. Examples of accelerators include dimethylaminopyridine tris (dimethylaminomethyl) phenol, tin octoate, imidazole or imidazole derivatives such as salts, substituted imidazoles or metal complexes thereof.

A number of inert components may be incorporated in the compositions as long as they do not adversely affect the increase in rate or level of cure of the adhesive composition. Also it is preferred if they do not adversely affect the storage life of the adhesive.

Inert components that may be incorporated in the adhesive include plasticisers such as phthalates or rosin esters, thermoplastic or thermosetting polymers. cured or uncured rubbers inorganic materials to modify the properties of the uncured or cured adhesive such as reinforcing fillers. reinforcing fibres or microspheres, or tackifiers and the like. The other components whether organic or inorganic, may be in any appropriate physical form, for example they may be in the form of powder, flake or fibres, or they may be compounded with one or more of the reactive components and are preferably present in an amount of from 5 to 50 percent by weight based on the total weight of the composition.

Electrically conductive fillers, e.g. metal flakes may be incorporated in the adhesive to provide electrical continuity, e.g., when the adhesives are used to seal parts of an electromagnetically shielded electrical wiring harness, as discussed hereinafter.

Preferably the adhesive compositions according to the invention contain a polymeric binder in order to prevent the adhesive crumbling off the surface to which it is applied before it is cured. This is a particular problem when using particulate adhesives according to the invention that are applied to heat-recoverable articles since the heat-recoverable articles, which will usually be in an expanded configuration, are generally easily deformable and are usually subjected to various degrees of mechanical abuse in storage. It has surprisingly been found that useful degrees of cohesion can be achieved without unacceptably affecting the curing performance.

Thus, another aspect of the invention provides a cohesive flexible substantially solid heat-curable adhesive coating formed from a mixture of substantially solid particles of a first reactive component with separate substantially solid particles of at least a second reactive component in a solution of not more than 15% by weight, based on the total dry weight of the coating. of a binder, the binder solution solvent being substantially a non-solvent for the first and second reactive components which are present in the dry coating as substantially unreacted separate particles capable of reacting together to effect curing when the coating is heated to the curing temperature. Preferably the binder content will be less than 10% more preferably less than 5%. and even more preferably less than 2.5%, and preferably at least 1% by weight. It will be understood that references to "substantially solid" particles exclude liquid filled microcapsules and are intended to mean particles which are substantially non-flowable (to render the coating storage stable) at the intended maximum storage temperature.

It is preferable to apply the adhesive onto the article by forming a dispersion of the reactive components in a non-solvent. either spraying or diocoating the adhesive, in which case the binder should be soluble in the non-solvent, and then removing the non-solvent by evaporation. The preferred binders for use with the adhesive are unsubstituted or substituted polyalkylene oxides that are soluble in water and water-soluble polyvinyl acetate polymers having substantially no free hydroxyl groups.

The preferred binders are the polyalkylene oxides and especially polyethylene oxide. It has been found that most solvents with the exception of water, water based solvents and light aliphatic solvents such as hexane solubilise one or other of the reactive components at least to some extent and so are unsuitable, while those binders that were considered for use with acceptable non-aqueous solvents lead to unacceptably poor cured adhesives. When water is used as a non-solvent for the dispersion the alkylene oxide and vinyl acetate polymers mentioned above produced adhesives having the best properties although it is envisaged that some other water-soluble polymers having substantially no free hydroxyl groups may be suitable. Whatever polymer is used for the binder, it is preferred that it be thermoplastic having a melting or softening point no higher than 20° C. above the highest melting or softening point of the reactive components and preferably no higher than the highest melting or softening point of the reactive components, in order to ensure that the binder melts completely when the adhesive is cured. When the adhesive is used in conjunction with a heat-recoverable article, the binder should have a melting or softening point no higher than the recovery temperature of the article and preferably no higher than 20° C. below the recovery temperature of the article, whatever the melting point of the reactive components may be.

Thus according to another aspect, the invention provides a heat-curable adhesive composition which comprises,
(a) a plurality of reactive components that will react together to cure the adhesive composition, the components existing separately from one another in the form of solid particles which are mixed together and which will fuse when heated and
(b) a polymeric binder comprising a substituted or unsubstituted polyalkylene oxide that is soluble in water.

Preferably the binder is present in the adhesive compositions only to relatively low levels, for example up to 15% by weight, more preferably up to 10% by weight and especially up to 5% by weight, based on the total weight of the adhesive composition, in order that the binder does not adversely affect the cured properties of the adhesive. It has been found that even though the quantity of binder used is generally significantly below the quantities used in the prior art. The uncured adhesive does not show any unacceptable tendency to crumble off the article during storage. Preferably the binder is present in quantities of at least 0.1%, more preferably at least 0.2% and especially at least 0.5% by weight. The optimum binder level being about 2% by weight, based on the total weight of the adhesive composition.

In addition, the use of relatively low quantities of binder reduces the adverse affect that binders generally have on the performance of the adhesives and, in particular, on their high temperature performance.

Preferably the adhesive composition is as described above.

The adhesive compositions according to the invention are particularly useful as latent curing adhesives for dimensionally heat-recoverable articles in view of their good storage life and their relatively rapid cure rate during recovery of the article. In order to maximise the cure rate of the adhesive, it is preferred that the or each reactive component has a melting or softening point that is no higher than 20° C. below the recovery temperature of the article. Preferred articles with which the adhesives are used include open-ended hollow articles which are for example used for enclosing parts of electrical harness and the like, although the adhesives may be used with other heat-recoverable articles and, if desired, with articles that are not heat-recoverable. Such articles, which are often termed end-caps, boots, transitions or udders, depending on the number of outlets, are preferably coated with the adhesive on their internal surface in the region of the or each outlet, but not in the central region. This may be achieved by applying the adhesive by a dip-coating method in which the outlet of the article is dipped in an aqueous dispersion of the adhesive, or if possible a dispersion in another non-solvent, and the water or other non-solvent is allowed to evaporate off.

The following Examples illustrate the invention:

EXAMPLES 1 to 3

A heat curable adhesive composition was formed based on the following composition:

| COMPONENTS | | Trade name | Parts by weight |
|---|---|---|---|
| 1 | Epoxy resin | Epikote 1001 (Ex Shell) | 100 |
| 2 (cure agent) | Polyamide | Macromelt 6071 (Ex Henkel) | 25 |
| | Epoxy diamine adduct | EDA 870 (Ex Anchor Chemicals | 75 |
| | Aluminosilicate filler | | 20 |
| | Carbon black | | 2 |
| 3 (flexibilizer) | Acid/Ethylene/vinyl acetate terpolymer | CXA 2002 (Ex du Pont) | 10 |
| 4 (binder) | Polyethylene oxide | Polyox (Ex Union Carbide | 2.4 |

Component 2 was formed by melt blending and then grinding on a fanbeater mill at room temperature until the desired particle size distribution is reached by adjusting the grinding conditions. Component 1 was also ground on a fan beater mill in the same manner as component 2. Component 3 was cryogenically ground and components 1, 2 and 3 were then tumble blended. Component 4 was dissolved in a quantity of water equal to the total weight of the other components to form a 2% solution to which was added the powdered components 1, 2 and 3 to form an aqueous dispersion of the complete adhesive.

This dispersion was applied to a standard Raychem 202K153 boot formed from Raychem −25 material by a dip-coating method. and the adhesive was dried in air at room temperature for 6 hours followed by drying under vacuum at room temperature for a further 7 hours. The resulting adhesive thickness was 0.6 to 0.7 mm.

The boot was recovered about a cable and the adhesive joint was tested by means of the static load test at 100° C. specified in the V.G. Specification No. 95343 part 14 as well as by the lap shear test according to A.S.T.M. D.1002. In the static load test, the cable and boot are subjected to a 5 kg load at 100° C. for 4 hours and the length that the cable had pulled out of the boot or the time to failure of the bond is recorded. For those bonds in which the cable had not been pulled out of boot, the strength of the resulting bond is then measured at room temperature. The results are shown in Table I for three adhesives that had differing particle size distributions. The particle size distributions of the adhesives are given in Table II.

TABLE I

| Example | Particle size | 100° C. lap shear strength N(25 mm)$^{-2}$ | V.G. static load test (100° C.) strength and pullout of passes time to failure of failures |
|---|---|---|---|
| 1 | Coarse | 140 | 5 passes mean pullout = 1 mm mean strength - 453 N |
| 2 | Medium | 250 | 1 pass pullout = 1 mm strength - 360 N 2 failures failure time 1.5 hr and 1 hr |
| 3 | Fine | 300 | All fail within 10 minutes |

TABLE II

| | Weight percentage of particles less than | | | | |
|---|---|---|---|---|---|
| Example | 50 um | 75 um | 100 um | 150 um | 300 um |
| 1 | 25 | 35 | 49 | 72 | 96 |
| 2 | 48 | 61 | 81 | 95 | 100 |
| 3 | 55 | 81 | 100 | 100 | 100 |

EXAMPLES 4 to 7

An adhesive composition was prepared according to Example 1 with the exception that the curing agent (component 2) was formed from a blend of two polyamides (80 parts Macromelt 6071 and 20 parts Versamid 140). and that the binder content was varied between 0 and 4%. The adhesive was applied to a −25 Raychem moulded part as an aqueous dispersion and dried and then used to form a bond between it and either a cable having a Raychem DR-25 jacket or an adaptor. The room temperature peel strength was measured according to V.G. 95343 part 14 Section 2.2 and 2.3. The results are shown in table III from which it can be seen that the cable peel strength increases considerably for small quantities of polyethylene oxide binder. In addition, The moulded parts were subject to a further test before being recovered onto the cable, in which they were squeezed to 75% of their original diameter in one direction and then rotated through 120° about their axis before being squeezed again. None of the adhesive was observed to fall off the part in any instance in which the binder level was between 1 and 4%.

EXAMPLES 8 to 10 (comparison)

Examples 5 to 7 were repeated with the exception that the binder was a styrene-isoprene-styrene rubber and the adhesive dispersion was formed in hexane as the non-solvent. The results for the cable peel and adaptor peel strength are also shown in table III and show that the rubber based binder gave significantly inferior performance.

TABLE III

| Example | Binder content (weight %) | Cable peel (N) | Adaptor peel (N) |
|---|---|---|---|
| 4 (comparison) | 0 | 63 | 132 |
| 5 | 1 | 112 | 130 |
| 6 | 2 | 113 | 110 |
| 7 | 4 | 111 | 150 |
| 8 (comparison) | 1 | 25 | 20 |
| 9 (comparison) | 2 | 40 | 43 |
| 10 (comparison) | 4 | 29 | 38 |

EXAMPLES 11 AND 12

In order to demonstrate the improved storage stability and curing of the adhesive formulations that contain an adduct, the following tow adhesive formulations were prepared by the method described in Example 1.

| Example | Components | | Parts by weight |
|---|---|---|---|
| 11 | (1) Epoxy | Epikote 1001 | 100 |
| | (2) Cure agent | Polyamide - Macromelt 6071 | 50 |
| | | adduct - EDA 870 | 50 |
| | (3) Flexibiloiser | CXA 2002 | 20 |
| 12 | (1) Epoxy | Epikote 1001 | 100 |
| | (2) Cure agent | Polyamide Macromelt 6071 | 80 |
| | | Polyamide Versamid 140 | 20 |
| | (3) Flexibiliser | CXA 2002 | 20 |

The minimum viscosity of the adhesives with respect to time were measured at 100° C. using a Ferranti-Shirley Viscometer both when fresh and after a few weeks storage at ambient temperature.

For Example 11 the minimum viscosity on heating reduced from 900 poise when fresh to 464 poise after 10 weeks at 40° C. whereas for Example 12 the minimum viscosity increased from 260 poise when fresh to 1125 poise after 12 weeks storage at 40° C. indicating that the adduct did not cure to any significant extent on storage whereas the polyamide based one did.

We claim:

1. A dimensionally heat-recoverable article having on a surface thereof a heat-curable adhesive coating comprising a mixture of substantially solid particles of a first reactive component with separate substantially solid particles of at least a second reactive component; the first and second components being capable of reacting together to effect curing of the coating when the heat-recoverable article is heated to its recovery temperature; and the particles having a size distribution in which not more than 40% by weight of the particles are less than 50 micrometers in size and at least 90% by weight of the particles are less than 300 micrometers in size.

2. An article according to claim 1, wherein the coating further comprises a polymeric binder which is substantially unreactive with the first and second reactive components at least at ambient temperatures.

3. An article according to claim 2, wherein the coating comprises not more than 15% by weight of the polymeric binder.

4. An article according to claim 2, wherein the coating comprises between 0.5 to 5% by weight of the polymeric binder.

5. An article according to claim 2, wherein the coating comprises not more than 2.5% by weight of the polymeric binder.

6. An article according to claim 3, 4, or 5, wherein the coating comprises at least 1% by weight of the polymeric binder.

7. An article according to claim 2, wherein the particles of the first reactive component are connected to those of the second reactive component substantially only by the polymeric binder.

8. An article according to claim 1, wherein the first reactive component in the coating comprises a thermoplastic epoxy resin.

9. An article according to claim 8, wherein the second reactive component in the coating comprises a compound containing reactive amine groups.

10. An article according to claim 8, wherein the second reactive component in the coating comprises an adduct of an epoxy resin with a compound containing reactive amine groups.

11. An article according to claim 9 or 10, wherein the compound containing reactive amine groups is a polyamide.

12. An article according to claim 9 or 10, wherein the compound containing reactive amine groups is ethylene diamine or ethylene triamine.

13. An article according to claim 1, wherein the particles in the coating have a size distribution in which not more than 30% by weight of the particles are less than 50 micrometers in size.

14. An article according to claim 1, wherein not more than 60% by weight of the particles in the coating are less than 75 micrometers in size.

15. An article according to claim 14, wherein not more than 50% by weight of the particles in the coating are less than 75 micrometers in size.

16. An article according to claim 1, wherein the particles in the coating have a weight average particle size in the range from 75 to 125 micrometers.

17. An article according to claim 1, wherein the first and second reactive components in the coating are capable of reacting together when brought into reactive contact at ambient temperature.

18. An article according to claim 1, wherein the coating further comprises electrically conductive particles to render the cured coating electrically conductive.

19. An article according to claim 1, wherein the article is a hollow article with at least one opening to the exterior and has the coating on the inner surface thereof in the region of an opening.

20. An article according to claim 1, wherein at least one of the first and second components in the coating has a melting or softening temperature no higher than 20° C. below the recovery temperature of the article.

* * * * *